United States Patent
Cho et al.

(10) Patent No.: US 11,183,755 B2
(45) Date of Patent: Nov. 23, 2021

(54) ELECTROMAGNETIC-WAVE TRANSMITTING COVER AND DOOR OUTER HANDLE INCLUDING SAME

(71) Applicants: Hyundai Motor Company, Seoul (KR); Kia Motors Corporation, Seoul (KR); Three Nine Co., Ltd, Ansan-si (KR)

(72) Inventors: Byung Kyu Cho, Seoul (KR); Jae Hwan Ha, Gyeonggi-do (KR); Seung Chan Hong, Gyeonggi-do (KR); Byung Sam Kim, Gyeonggi-do (KR); Yong Ju Cho, Gyeonggi-do (KR); Ki Yong Park, Gyeonggi-do (KR)

(73) Assignees: Hyundai Motor Company, Seoul (KR); Kia Motors Corporation, Seoul (KR); Three Nine Co., Ltd, Gyeonggi-do (KR)

(*) Notice: Subject to any disclaimer, the term of this patent is extended or adjusted under 35 U.S.C. 154(b) by 0 days.

(21) Appl. No.: 16/985,874

(22) Filed: Aug. 5, 2020

(65) Prior Publication Data

US 2021/0159593 A1    May 27, 2021

(30) Foreign Application Priority Data

Nov. 26, 2019    (KR) .................. 10-2019-0153655

(51) Int. Cl.
     *H01Q 1/42*      (2006.01)
     *H01Q 1/32*      (2006.01)

(52) U.S. Cl.
     CPC .......... *H01Q 1/425* (2013.01); *H01Q 1/3233* (2013.01); *H01Q 1/422* (2013.01)

(58) Field of Classification Search
     CPC ....... H01Q 1/425; H01Q 1/3233; H01Q 1/422
     See application file for complete search history.

(56) References Cited

U.S. PATENT DOCUMENTS

| | | | |
|---|---|---|---|
| 6,933,831 B2 * | 8/2005 | Ieda ................. | B60R 25/246 340/426.1 |
| 7,300,190 B2 * | 11/2007 | Nitawaki ............ | E05B 85/01 362/100 |
| 8,162,360 B2 * | 4/2012 | Takaya ............... | E05B 79/04 292/336.3 |
| 10,472,517 B2 | 11/2019 | Cho et al. | |

(Continued)

FOREIGN PATENT DOCUMENTS

| | | |
|---|---|---|
| JP | 2012102567 A | 5/2012 |
| KR | 10-0848082 B1 | 7/2008 |

(Continued)

*Primary Examiner* — Lam T Mai

(74) *Attorney, Agent, or Firm* — Mintz Levin Cohn Ferris Glovsky and Popeo, P.C.; Peter F. Corless

(57) ABSTRACT

Disclosed are an electromagnetic-wave transmitting cover that transmits electromagnetic waves transmitted/received by an LF antenna and an RF antenna and an electric field generated from a capacitance touch sensor while realizing a metallic texture, and a door outer handle including the same. The electromagnetic-wave transmitting cover includes: a substrate; a primer layer formed on a surface of the substrate; and a first metal layer formed by depositing and having a plurality of first microcracks penetrating in a thickness direction.

20 Claims, 12 Drawing Sheets

(56) References Cited

U.S. PATENT DOCUMENTS

| | | | | |
|---|---|---|---|---|
| 2005/0073804 A1* | 4/2005 | Maruyama | ............... | B44C 5/00 |
| | | | | 361/600 |
| 2010/0321946 A1* | 12/2010 | Dingman | ............... | E05B 85/16 |
| | | | | 362/501 |
| 2011/0259661 A1* | 10/2011 | Thiele | ................. | G01D 11/245 |
| | | | | 180/271 |
| 2013/0130674 A1* | 5/2013 | De Wind | ............ | B60Q 1/2665 |
| | | | | 455/420 |
| 2014/0185155 A1* | 7/2014 | Lee | .......................... | B32B 7/02 |
| | | | | 359/884 |
| 2016/0192518 A1* | 6/2016 | Watanabe | ................ | G01S 7/02 |
| | | | | 361/807 |
| 2016/0248152 A1* | 8/2016 | Takao | .................... | H01Q 1/422 |
| 2018/0207900 A1* | 7/2018 | Kosugi | .................... | H01Q 1/42 |
| 2019/0288383 A1* | 9/2019 | Shiozaki | ................. | H01Q 1/42 |

FOREIGN PATENT DOCUMENTS

| | | |
|---|---|---|
| KR | 10-1810815 B1 | 12/2017 |
| KR | 10-2019-0000014 A | 1/2019 |
| KR | 10-2019-0035198 A | 4/2019 |

\* cited by examiner

-RELATED ART-

-RELATED ART-

FIG. 4A

| Classification | Oligomer | | | | | | Monomer | | | | Solvent |
|---|---|---|---|---|---|---|---|---|---|---|---|
| | Urethane Acrylate | | | | Polyester acrylate | Epoxy acrylate | HDDA | TMPTA | PETA | DPHA | |
| | Two functional groups | Four functional groups | Six functional groups | Nine functional groups | | | | | | | |
| Example 1 | 15 | - | 15 | - | - | - | 15 | 15 | - | - | 40 |
| Example 2 | 10 | - | 15 | - | - | - | 15 | 15 | - | - | 45 |
| Comparative Example 1 | 0 | - | 15 | - | - | - | 15 | 15 | - | - | 55 |
| Comparative Example 2 | 5 | - | 15 | - | - | - | 15 | 15 | - | - | 50 |
| Comparative Example 3 | 25 | - | 15 | - | - | - | 15 | 15 | - | - | 30 |
| Comparative Example 4 | 15 | - | 0 | - | - | - | 15 | 15 | - | - | 55 |
| Comparative Example 5 | 15 | - | 5 | - | - | - | 15 | 15 | - | - | 50 |
| Comparative Example 6 | 15 | - | 25 | - | - | - | 15 | 15 | - | - | 30 |
| Comparative Example 7 | 15 | 15 | - | - | - | - | 15 | 15 | - | - | 40 |
| Comparative Example 8 | 15 | - | - | 15 | - | - | 15 | 15 | - | - | 40 |
| Comparative Example 9 | 15 | - | 15 | - | - | - | 15 | - | 15 | - | 40 |
| Comparative Example 10 | 15 | - | 15 | - | - | - | 15 | - | - | 15 | 40 |
| Comparative Example 11 | 15 | - | 7.5 | 7.5 | - | - | 7.5 | 15 | - | 7.5 | 40 |
| Comparative Example 12 | 15 | - | 7.5 | 0 | - | - | 7.5 | 15 | - | 7.5 | 47.5 |
| Comparative Example 13 | 15 | - | - | 15 | - | - | 7.5 | 15 | - | 7.5 | 40 |
| Comparative Example 14 | 15 | - | 7.5 | 7.5 | - | - | 7.5 | 15 | - | 0 | 47.5 |
| Comparative Example 15 | 15 | - | 7.5 | 7.5 | - | - | 7.5 | 15 | - | 15 | 32.5 |
| Comparative Example 16 | - | - | - | - | 15 | 45 | - | - | - | - | 40 |
| Comparative Example 17 | - | - | - | - | 10 | 30 | - | - | - | - | 60 |
| Comparative Example 18 | 10 | - | 15 | - | - | - | 15 | 30 | 6.5 | - | 23.5 |

FIG. 4B

| Classification | Results of evaluation ||||||||
|---|---|---|---|---|---|---|---|---|
| | Lucidity (exterior) | Humidity resistance | Chemical resistance | Water resistance | Adhesion | Contact angle(deg) | Number of microcracks (EA) | Performance (capacitance touch sensor) | Receiving distance (m) |
| Example 1 | OK | OK | OK | OK | OK | 66.5 | 237 | Satisfaction | 55 |
| Example 2 | OK | OK | OK | OK | OK | 68.4 | 222 | Satisfaction | 53 |
| Comparative Example 1 | - | - | - | - | NG | - | - | - | - |
| Comparative Example 2 | - | - | - | - | NG | - | - | - | - |
| Comparative Example 3 | NG | OK | NG | OK | - | 77.4 | 168 | Dissatisfaction | 35 |
| Comparative Example 4 | NG | - | - | - | - | - | - | - | - |
| Comparative Example 5 | NG | - | - | - | - | - | - | - | - |
| Comparative Example 6 | NG | - | - | - | - | 76.5 | 172 | Dissatisfaction | 34 |
| Comparative Example 7 | NG | - | - | - | - | - | - | - | - |
| Comparative Example 8 | NG | - | - | - | - | - | - | - | - |
| Comparative Example 9 | NG | - | - | - | - | - | - | - | - |
| Comparative Example 10 | NG | - | - | - | - | - | - | - | - |
| Comparative Example 11 | OK | OK | OK | OK | OK | 72.9 | 164 | Dissatisfaction | 26 |
| Comparative Example 12 | - | NG | NG | NG | - | - | - | - | - |
| Comparative Example 13 | NG | - | - | - | - | - | - | - | - |
| Comparative Example 14 | - | NG | NG | NG | - | - | - | - | - |
| Comparative Example 15 | NG | - | - | - | - | - | - | - | - |
| Comparative Example 16 | OK | OK | OK | OK | OK | 83.5 | 159 | Dissatisfaction | 25 |
| Comparative Example 17 | OK | OK | OK | OK | OK | 77.5 | 169 | Dissatisfaction | 34 |
| Comparative Example 18 | OK | OK | OK | OK | OK | 80 | 160 | Dissatisfaction | 30 |

FIG. 6
| Classification | Photograph of evaluation of water contact angle | Water contact angle |
|---|---|---|
| Example 1 | 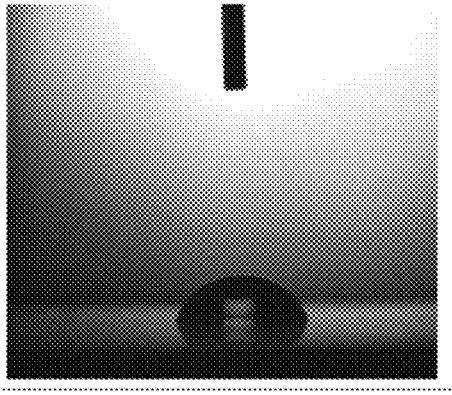 | 68.1° |
| Comparative Example 11 | 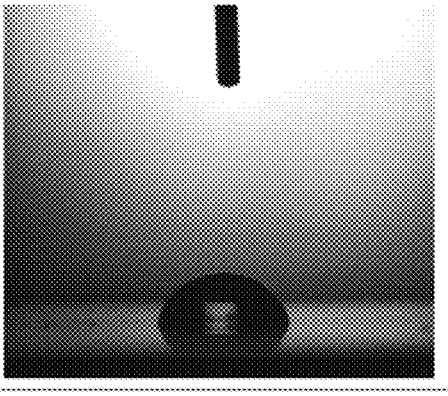 | 72.9° |
| Comparative Example 18 | 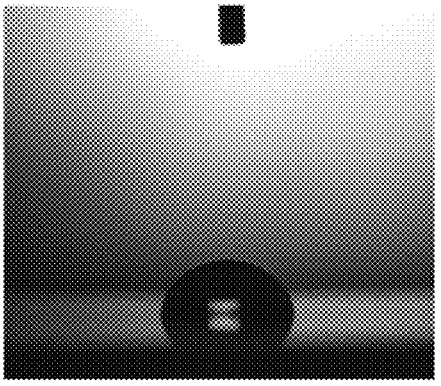 | 80.0° |

FIG. 7

| Classification | Thickness of second metal layer Electric Field(nm) | Electic Field Variation in electric Field($\Delta E$) | Gloss(GU) | Color difference (L*) |
|---|---|---|---|---|
| Comparative Example 19 | 0 | 68 | 347 | 75.8 |
| Comparative Example 20 | 7 | 65 | 402 | 84.2 |
| Example 3 | 25 | 65 | 485 | 87.3 |
| Example 4 | 40 | 57 | 502 | 87.2 |
| Example 5 | 70 | 40 | 560 | 90.1 |
| Comparative Example 21 | 110 | 15 | 570 | 91.5 |

FIG. 8
| Classification | Evaluation data | Variation in electric Field ($\triangle E$) |
|---|---|---|
| Comparative Example 16 | 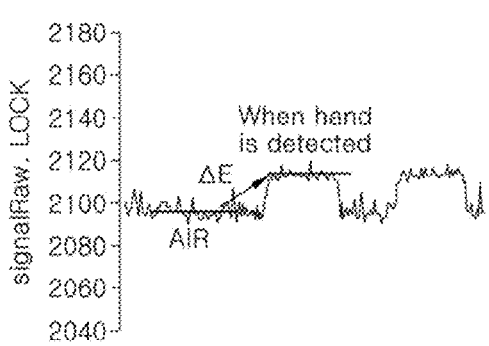 | 15 |
| Example 1 | 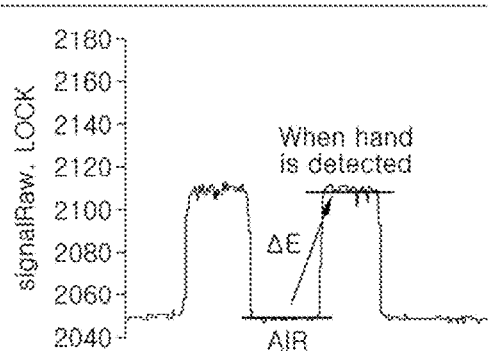 | 60 |

ELECTROMAGNETIC-WAVE TRANSMITTING COVER AND DOOR OUTER HANDLE INCLUDING SAME

CROSS-REFERENCE TO RELATED APPLICATION

This application claims the priority benefit of Korean Patent Application No. 10-2019-0153655, filed on Nov. 26, 2019 in the Korean Intellectual Property Office, the invention of which is incorporated herein by reference.

TECHNICAL FIELD

The present invention relates to an electromagnetic-wave transmitting cover and a door outer handle including the same and. The electromagnetic-wave transmitting cover may transmit electromagnetic waves transmitted/received by an LF antenna and an RF antenna and an electric field generated from a capacitance touch sensor as well as realizing a metallic texture.

BACKGROUND OF THE INVENTION

With the development of vehicle IT technology, vehicles can provide various functions for convenience of a user in addition to a function as a basic moving means.

For example, a smart door opening/closing system that supports functions such as door automatic opening/closing and starting of the vehicle has been developed. To determine whether a smart key has right authority over the vehicle, the smart door opening/closing system performs authentication on the smart key by transmitting a low frequency (LF) signal from a smart key electronic control unit (SMK ECU) to the smart key and receiving a radio frequency (RF) response signal of the LF signal from the smart key. In the state in which the authentication is performed on the smart key, if a driver touches a touch sensor installed in a door outer handle of the vehicle, a locked state of a vehicle door is released.

Further, research of controlling automatic opening/closing of the vehicle door through near field communication (NFC) with a smart phone has recently been conducted. For this smart key system, a smart door outer handle applied to a smart door opening/closing system is provided on both doors of the vehicle.

For example, in the related art, FIG. 1A shows a door outer handle applied to a general smart door opening/closing system, and FIG. 1B shows a modification of the door outer handle applied to the general smart door opening/closing system. As shown in FIG. 1A, the door outer handle applied to the general smart key system includes a door body 1, a sensing body 2 which is disposed on a surface of the door body 1 and on which an LF antenna 4a, an RF antenna 4b, an NFC antenna 5, and a capacitance touch sensor 6 are mounted, and a cover 3 that is disposed on the surface of the door body 1 to cover the sensing body 2. Further, as shown in FIG. 1B, the door outer handle applied to the general smart key system may be modified and embodied to include a door body 1, a sensing body 2 which is disposed on a surface of the door body 1 and on which an LF antenna 4a, an RF antenna 4b, an NFC antenna 5, and a capacitance touch sensor 6 are mounted, and a cover 3 that is disposed on a surface of the sensing body 2 to cover the sensing body 2.

In this case, the LF antenna 4a and the RF antenna 4b mounted on the sensing body 2 are used to perform authentication of a smart key which a driver possesses, and the NFC antenna 5 is used for NFC with a smart phone which the driver possesses and security of which is approved. The capacitance touch sensor 6 detects a touch of the driver having the smart key, and releases a locked state of the vehicle door.

Meanwhile, the cover 3 is formed of plastic or a plastic composite to protect the LF antenna 4a, the RF antenna 4b, the NFC antenna 5, and the capacitance touch sensor 6 that are mounted on the sensing body 2, and the cover formed of plastic or a plastic composite has to secure environmental durability reliability of a vehicle exterior material such as water resistance/humidity resistance/chemical resistance.

Further, although the cover 3 covers the sensing body 2, the cover 3 should be able to secure detection distances which the LF antenna 4a, the RF antenna 4b, and the capacitance touch sensor 6 require.

Meanwhile, for a beautiful exterior, a metallic texture has been made by a surface treatment of coating a surface of the cover 3 formed of plastic or a plastic composite with chromium. For example, a coating layer coated with chromium that is a metal material absorbs or reflects the electromagnetic waves transmitted/received by the LF antenna 4a and the RF antenna 4b, and the electric field generated from the capacitance touch sensor 6 to obstruct communication between the vehicle and the smart phone or the smart key of the driver.

Thus, in the cover 3 used for the door outer handle applied to the smart key system so far, the coating layer coated with chromium is applied only to a region in which the electromagnetic waves transmitted/received by the LF antenna 4a and the RF antenna 4b and the electric field generated from the capacitance touch sensor 6 interfere with each other.

Consequently, there are many restrictions in a design aspect in realizing the door outer handle, and there is a problem that production costs caused by separate injection and assembly are raised.

Further, in a case of the smart key for conveniently opening/closing the vehicle door, a separate structure on which the coating layer coated with chromium is formed may be used to realize a premium feeling. Due to the formation of this metal coating layer, the detection distances of the electromagnetic waves transmitted/received by the RF antenna and the electric field generated from the capacitance touch sensor may not be secured between the smart key and the door outer handle of the vehicle.

The information disclosed in the background of the present invention section is only for the enhancement of understanding of the background of the present invention, and should not be taken as an acknowledgment or as any form of suggestion that this information forms a prior art that would already be known to a person skilled in the art.

SUMMARY OF THE INVENTION

In preferred aspects, provided are an electromagnetic-wave transmitting cover capable of transmitting electromagnetic waves transmitted/received by an LF antenna and an RF antenna and an electric field generated from a capacitance touch sensor while realizing a metallic texture, and a door outer handle including the same.

In accordance with an aspect of the present invention, an electromagnetic-wave transmitting cover includes: a substrate; a primer layer formed on a surface of the substrate; and a first metal layer formed a surface of the primer layer and having a plurality of first microcracks penetrating in a thickness direction.

The substrate may be formed of plastic or a polymeric resin.

The primary layer may include: an amount of about 7.5 to 20 wt % urethane acrylate having two functional groups, an amount of about 10 to 20 wt % urethane acrylate having six functional groups, an amount of about 20 to 40 wt % of one or more monomers selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent, based on the total weight of the primary layer.

The first metal layer may include one or more selected from the group consisting of chromium (Cr), a Cr alloy, titanium (Ti), and a Ti alloy, and may be formed by depositing these metallic components.

The term "metallic component" as used herein refers to a material that can provide metallic appearance, texture, and/or color as being applied on a substrate. The metallic component may suitably include one or more metal elements, e.g., chromium (Cr), a Cr alloy, titanium (Ti), a Ti alloy, an aluminum (Al) or an Al alloy, and/or one or more natural materials containing natural dye or substance to impart metallic color or reflection.

The one or more monomers of which the primer layer may suitably include an amount of about 10 to 20 wt % hexanediol diacrylate (HDDA) and an amount of about 10 to 20 wt % trimethylolpropane triacrylate (TMPTA).

A contact angle of the primer layer may be equal to or less than about 70°.

The number of first microcracks determined according to a determination based on ISO 643 may be equal to or greater than about 200 in the first metal layer.

The electromagnetic-wave transmitting cover may further include a second metal layer formed on a surface of the first metal layer and having a plurality of second microcracks that penetrate in a thickness direction and communicate with the first microcracks. The second metal layer may include aluminum (Al), and may be formed by depositing Al component.

The electromagnetic-wave transmitting cover may further include a protective layer formed on a surface of the second metal layer. The protective layer may include a resins, and for example, the protective layer is preferably a UV hard coating layer.

In another aspect of the present invention, a door outer handle is a door outer handle used for a door of a vehicle. The door outer handle may include: a door body; a sensing body which is disposed on a surface of the door body and on which an LF antenna, an RF antenna, and a capacitance touch sensor are mounted; and a cover that is disposed to cover the sensing body and is provided such that electromagnetic waves transmitted and received by the LF and RF antennas mounted on the sensing body and an electric field generated from the capacitance touch sensor are transmitted. The cover includes: a substrate; a primer layer formed on a surface of the substrate; and a first metal layer formed on a surface of the primer layer and having a plurality of first microcracks penetrating in a thickness direction.

The primer layer may suitably include an amount of about 7.5 to 20 wt % urethane acrylate having two functional groups, an amount of about 10 to 20 wt % urethane acrylate having six functional groups, an amount of about 20 to 40 wt % of one or more monomers selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent. All the wt % are based on the total weight of the primer layer.

The first metal layer may include one or more selected from the group consisting of chromium (Cr), a Cr alloy, titanium (Ti), and a Ti alloy, and may be formed by depositing these metal component.

The cover may further include: a second metal layer formed on a surface of the first metal layer and having a plurality of second microcracks that penetrate in a thickness direction and communicate with the first microcracks; and a protective layer formed on a surface of the second metal layer. The second metal layer may suitably include aluminum (Al) and may be formed by depositing the Al component. The protective layer may suitably include a resin.

The first metal layer may suitably have a thickness of about 10 to 150 nm, and the second metal layer preferably may suitably have a thickness of about 10 to 90 nm.

The number of first microcracks determined according to a determination based on ISO 643 may be equal to or greater than about 200 in the first metal layer.

A variation (ΔE) in the electric field of the cover may be equal to or greater than about 30.

A gloss of the cover may be equal to or greater than about 450 GU.

A color difference (L*) of the cover may be equal to or greater than about 85.

In another aspect, provided is a vehicle comprising the door outer handle described herein.

Also provided is a method of producing an electromagnetic-wave transmitting cover. The method may include providing a substrate; forming a primer layer on the substrate by coating a composition; and forming a first metal layer formed on a surface of the primer layer by depositing one or more selected from the group consisting of chromium (Cr), a Cr alloy, titanium (Ti), and a Ti alloy.

The coating composition comprises: an amount of about 7.5 to 20 wt % urethane acrylate having two functional groups, an amount of about 10 to 20 wt % urethane acrylate having six functional groups, amount of about 20 to 40 wt % of one or more monomers selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent, all the wt % based on the total weight of the primer layer.

The method may further include forming a second metal layer on a surface of the first metal layer by depositing aluminum (Al).

The method may further include forming a protective layer formed on a surface of the second metal layer. The protective layer may include a resin According to various exemplary embodiments of the present invention, in configuring a cover for a door outer handle, components and contents of which a primer layer may be formed are adjusted, and a surface contact angle of the primer layer may be adjusted. Thus, artificial microcracks can be formed in a metal layer deposited on the primer layer at a desired level.

As such, the metal layer may be formed in the cover, and thereby a metallic texture can be realized on the door outer handle, and electromagnetic waves transmitted/received by an LF antenna and an RF antenna and an electric field generated from a capacitance touch sensor can be transmitted through the microcracks formed in the metal layer, so that an effect of securing sufficient detection distances can be expected.

Other aspects of the invention are disclosed infra.

BRIEF DESCRIPTION OF THE DRAWINGS

The above and other aspects, features, and advantages of the present invention will be more apparent from the following detailed description taken in conjunction with the accompanying drawings, in which:

FIGS. 4A and 4B show conditions and results of examples and comparative examples according to the present invention;

FIG. 6 shows photographs of evaluation of contact angles of Example 1, Comparative Example 11, and Comparative Example 1;

FIG. 7 shows a variation ($\Delta E$) in electric field, a gloss, and a color difference according to the thickness of the second metal layer deposited on the surface of the first metal layer according to exemplary embodiments of the present invention;

FIG. 8 shows the performance of the capacitance touch sensor of Comparative Example 16 and Example 1.

DETAILED DESCRIPTION

Figure 1A:
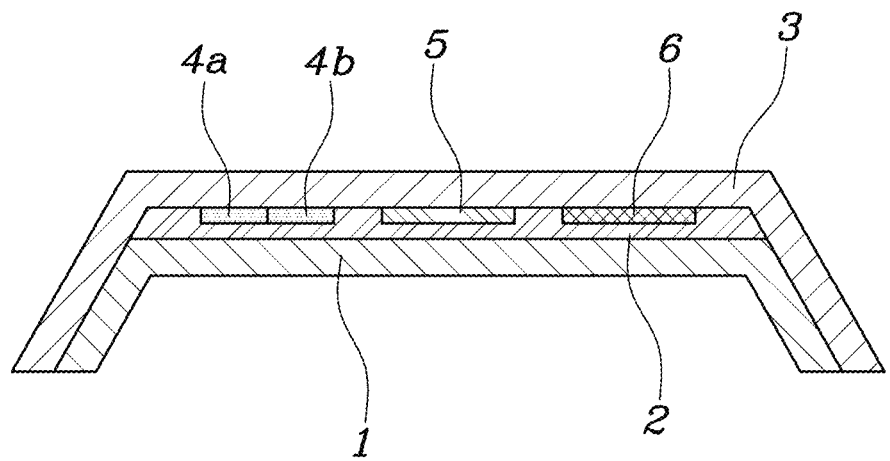
FIG. 1A is a view illustrating a door outer handle applied to a general smart door opening/closing system.

Hereinafter, embodiments of the present invention will be described in greater detail with reference to the accompanying drawings. The present invention may, however, be embodied in many different forms and should not be construed as limited to the embodiments set forth herein. Rather, these embodiments are provided so that the present invention will be thorough and complete, and will fully convey the scope of the invention to those skilled in the art. Like reference signs refer to like elements throughout the drawings.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof. Further, when a portion such as a layer, a film, a region, or a plate is referred to as being "above" the other portion, it may be not only "right above" the other portion, or but also there may be another portion in the middle. On the contrary, when a portion such as a layer, a film, a region, or a plate is referred to as being "under" the other portion, it may be not only "right under" the other portion, or but also there may be another portion in the middle.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2A:
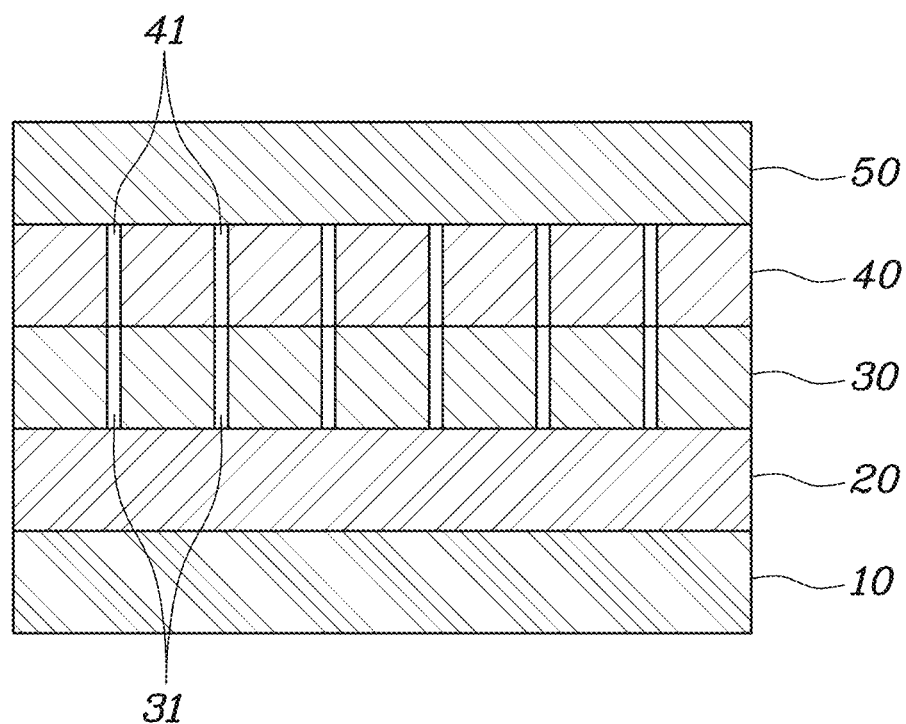
FIG. 2A shows an exemplary electromagnetic-wave transmitting cover applied to a door outer handle according to an exemplary embodiment of the present invention.
Figure 2B:
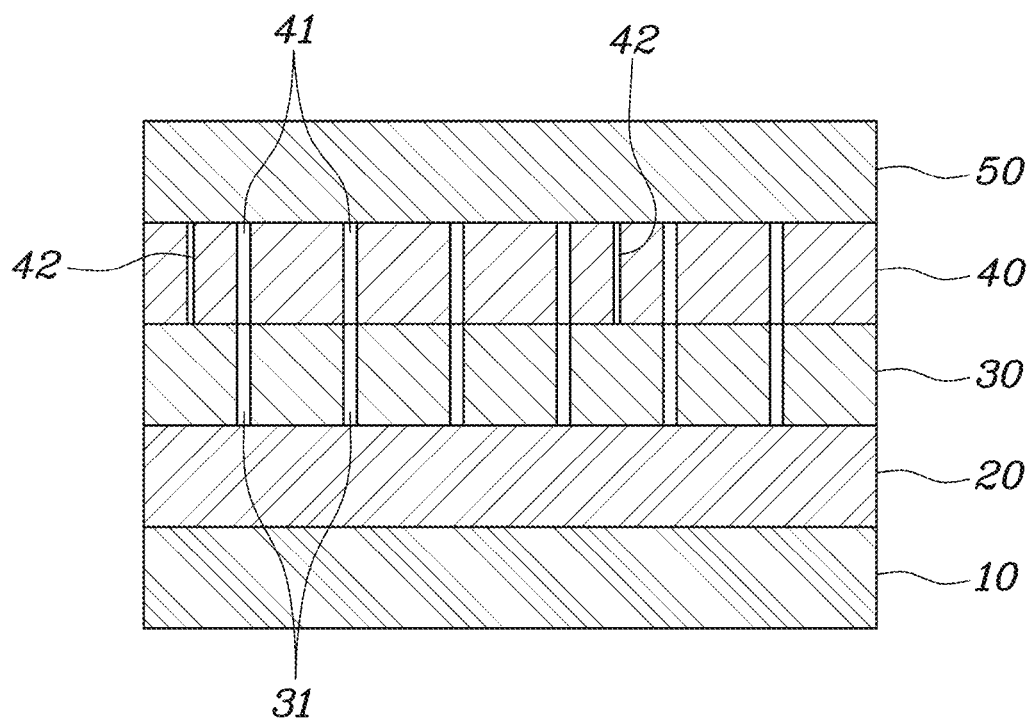
FIG. 2B shows an exemplary electromagnetic-wave transmitting cover applied to a door outer handle according to an exemplary embodiment of the present invention.
Figure 3:
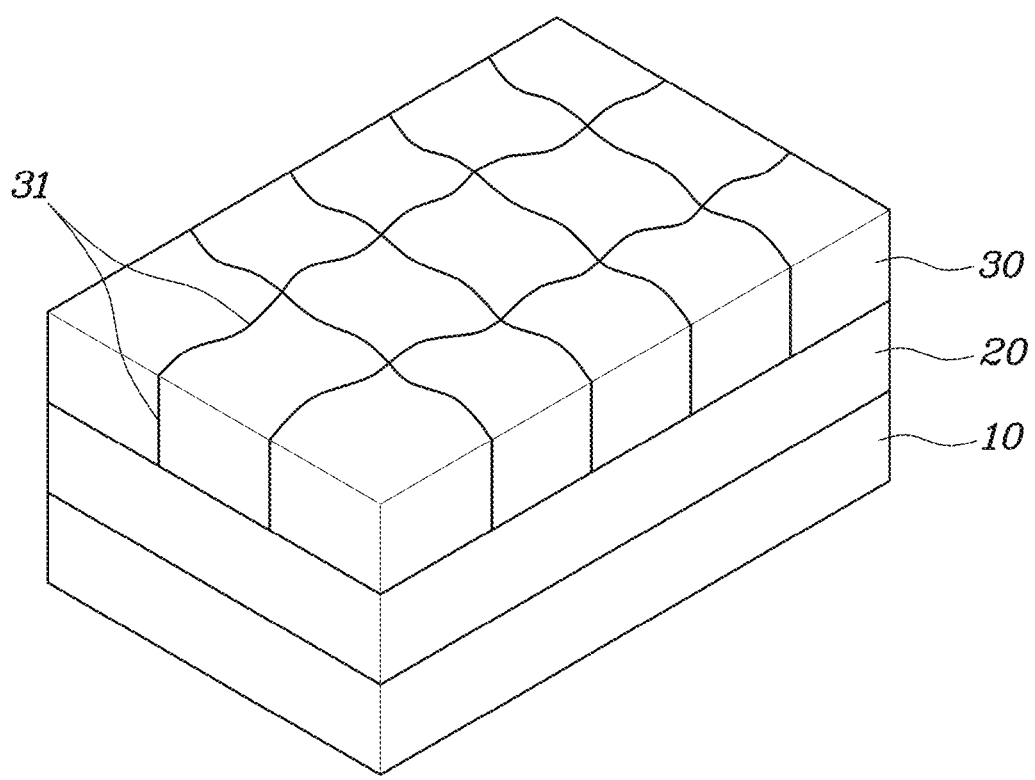
FIG. 3 shows exemplary main parts of the electromagnetic-wave transmitting cover applied to the door outer handle according to an exemplary embodiment of the present invention.

In an aspect, provided is an electromagnetic-wave transmitting cover. FIG. 2A is a view illustrating an electromagnetic-wave transmitting cover applied to a door outer handle according to an exemplary embodiment of the present invention. FIG. 2B is a view illustrating an electromagnetic-wave transmitting cover applied to a door outer handle according to an exemplary embodiment of the present invention. FIG. 3 is a view illustrating main parts of the electromagnetic-wave transmitting cover applied to the door outer handle according to the embodiment of the present invention.

First, a door outer handle to which an electromagnetic-wave transmitting cover will be described hereinafter. The electromagnetic-wave transmitting cover is preferably applied to the door outer handle. However, the component to which the electromagnetic-wave transmitting cover is applied is not limited to only the door outer handle, and the electromagnetic-wave transmitting cover may be applied to various components that needs penetration of electromagnetic waves and a metallic texture after a shape thereof is changed. Hereinafter, the door outer handle will be described as an example of the component to which the electromagnetic-wave transmitting cover according to the embodiment of the present invention is applied.

In the related art, as shown in FIG. 1A, the door outer handle to which the electromagnetic-wave transmitting cover may be applied includes a door body 1, a sensing body 2 which is disposed on a surface of the door body 1 and on which an LF antenna 4a, an RF antenna 4b, an NFC antenna 5, and a capacitance touch sensor 6 are mounted, and a cover 3 that is disposed on the surface of the door body 1 to cover the sensing body 2. The electromagnetic-wave transmitting cover according to various exemplary embodiments of the present invention is used as the cover 3.

Here, the door body 1, the sensing body 2, and the cover 3 may be embodied in various forms. Especially, since configurations of the door body 1 and the sensing body 2 are embodied by those of a door body and a sensing body that are applied to a general smart door opening/closing system, concrete description thereof will be omitted.

Meanwhile, the electromagnetic-wave transmitting cover may be disposed on the surface of the door body 1 to cover the sensing body 2, and may be provided such that electromagnetic waves transmitted and received by the LF and RF antennas 4a and 4b mounted on the sensing body 2 and an electric field generated from the capacitance touch sensor 6 are transmitted.

Figure 1B:
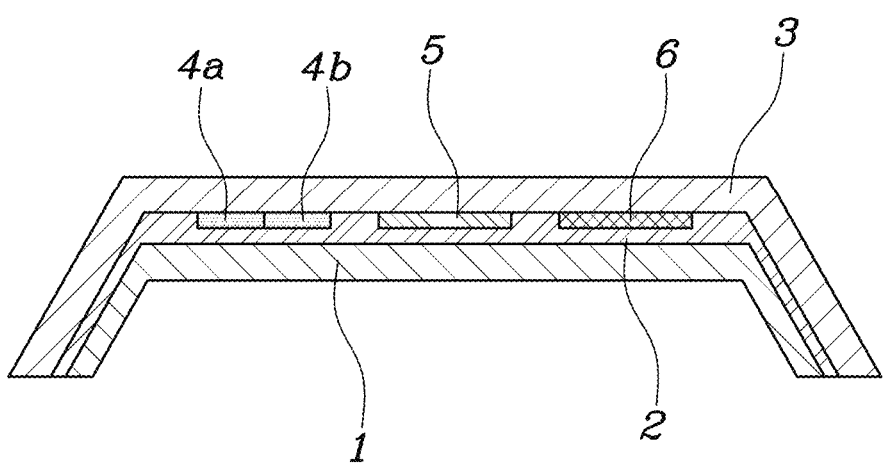
FIG. 1B is a view illustrating a modification of the door outer handle applied to the general smart door opening/closing system.

Further, as shown in FIG. 1B, an electromagnetic-wave transmitting cover may be directly joined and disposed on a surface of the sensing body 2 to cover the sensing body 2. Thus, the electromagnetic waves transmitted and received by the LF and RF antennas 4a and 4b mounted on the sensing body 2 and the electric field generated from the capacitance touch sensor 6 may penetrate the cover 3.

Meanwhile, as illustrated in FIGS. 2A and 3, the electromagnetic-wave transmitting cover may include a substrate 10 formed of plastic, a primer layer 20 that is formed on a surface of the substrate 10, and a first metal layer 30 that is formed by depositing at least one of chromium (Cr), a Cr alloy, titanium (Ti), and a Ti alloy on a surface of the primer layer 20 and has a plurality of first microcracks 31 penetrating in a thickness direction. The electromagnetic-wave transmitting cover may further include a second metal layer 40 that is formed by depositing aluminum (Al) on a surface of the first metal layer 30 and has a plurality of second microcracks 41 that penetrate in a thickness direction and communicate with the first microcracks 31, and a protective layer 50 that is formed of a resin on a surface of the second metal layer 40.

The substrate 10 may be formed of plastic to embody a shape of the cover 3, and is provided in a shape corresponding to a shape of the door body 1. For example, the substrate 10 may be formed of polycarbonate (PC) and an acrylonitrile-butadiene-styrene resin (ABS).

The primer layer 20 may improve an adhesive force between the substrate 10 and the first metal layer 30. The number of first microcracks 31 formed in the first metal layer 30 may be adjusted by adjusting a kind and content of a component of which the primer layer 20 may be formed. For example, the artificial first microcracks 31 may be formed in the first metal layer 30 at a desired level by adjusting a surface contact angle of the primer layer 20 and thus adjusting a deposition rate and tensile stress of the first metal layer 30 coated on the surface of the primer layer 20.

For example, the primer layer 20 may suitably include an amount of about 7.5 to 20 wt % urethane acrylate having two functional groups, an amount of about 10 to 20 wt % urethane acrylate having six functional groups, an amount of about 20 to 40 wt % one or more monomer selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent. All the wt % are based on the total weight of the primer layer.

The primer layer may be formed by coating a coating composition that includes the above components. For example, the coating composition may include an amount of about 7.5 to 20 wt % urethane acrylate having two functional groups, an amount of about 10 to 20 wt % urethane acrylate having six functional groups, an amount of about 20 to 40 wt % one or more monomer selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent, wt % are based on the total weight of the coating composition.

The one or more monomers of which the primer layer 20 may suitably include an amount of about 10 to 20 wt % hexanediol diacrylate (HDDA) and an amount of about 10 to 20 wt % trimethylolpropane triacrylate (TMPTA). Alternatively, hexanediol diacrylate (HDDA) and trimethylolpropane triacrylate (TMPTA) may be each replaced with any one of 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA).

The surface contact angle of the primer layer 20 having the components and contents as described above may be equal to or less than about 70°. When the surface contact angle of the primer layer 20 is greater than about 70°, the number of artificial first microcracks 31 formed in the first metal layer 30 deposited on the surface of the primer layer 20 may not be sufficient and the penetration of the electromagnetic waves and the electric field through the first microcracks 31 may not be achieved at a desired level.

The first metal layer 30 may be formed by depositing at least one of chromium (Cr), a Cr alloy, titanium (Ti), and a Ti alloy on the surface of the primer layer 20, and may have the plurality of artificial first microcracks 31 penetrating in a thickness direction. Thus, the electromagnetic waves transmitted and received through the first microcracks 31 by the LF antenna 4a and the RF antenna 4b and the electric field generated from the capacitance touch sensor 6 are transmitted, and thereby performance of the LF antenna 4a and the RF antenna 4b, and performance of the capacitance touch sensor 6 that are provided for the door outer handle is ensured.

Further, since the first metal layer 30 is formed by depositing at least one of chromium (Cr), a Cr alloy, titanium (Ti), and a Ti alloy, the metallic texture can be realized. In this case, a source of which the first metal layer 30 may be formed from hard metals and their alloys by which the metallic texture is realized and metals and their alloys by which the first microcracks 31 may be formed at a desired level. The first metal layer 30 may be formed using chromium (Cr).

The number of first microcracks 31 that are artificially formed in the first metal layer 30 is preferably limited. For example, the number of first microcracks 31 determined according to a determination based on ISO 643 (Steel-Micrographic determination of the ferritic or austenitic grain size) may be preferably equal to or greater than about 200 in the first metal layer 30.

When the number of first microcracks 31 is less than about 200, amounts at which the electromagnetic waves transmitted and received by the LF antenna 4a and the RF antenna 4b and the electric field generated from the capacitance touch sensor 6 are transmitted are reduced, and thereby the performance of the LF antenna 4a and the RF antenna 4b, and the performance of the capacitance touch sensor 6 may not be ensured at a desired level.

Further, a thickness of the first metal layer 30 may suitably range from about 10 to about 150 nm. When the thickness of the first metal layer 30 is less than about 10 nm, the metallic texture may not be realized. When the thickness of the first metal layer 30 is greater than about 150 nm, lengths of the first microcracks 31 in a thickness direction may be lengthened, and paths along which the electromagnetic waves transmitted and received by the LF antenna 4a and the RF antenna 4b and the electric field generated from the capacitance touch sensor 6 are transmitted may be lengthened. The performance of the LF antenna 4a and the RF antenna 4b, and the performance of the capacitance touch sensor 6 may not be ensured at a desired level.

Meanwhile, the second metal layer 40 may be formed to complement the metallic texture realized by the first metal layer 30 to express a more lifelike metallic texture, and may be formed by depositing aluminum (Al) on the surface of the first metal layer 30. In this case, like the first metal layer 30, the second metal layer 40 may have the plurality of second microcracks 41 that penetrate in a thickness direction to transmit the electromagnetic waves and the electric field and communicate with the first microcracks 31 formed in the first metal layer 30.

The number of second microcracks 41 may correspond to the number of first microcracks 31.

Further, a thickness of the second metal layer 40 may suitably range from about 10 to about 90 nm. When the thickness of the second metal layer 40 is less than about 10 nm, the metallic texture may not be realized. When the thickness of the second metal layer 40 is greater than about 90 nm, lengths of the second microcracks 41 in a thickness direction may be lengthened, and paths along which the electromagnetic waves transmitted and received by the LF antenna 4a and the RF antenna 4b and the electric field generated from the capacitance touch sensor 6 are transmitted may be lengthened, so that the performance of the LF antenna 4a and the RF antenna 4b, and the performance of the capacitance touch sensor 6 may not be ensured at a desired level.

Further, as shown in FIG. 2B, third microcracks 42 that do not communicate with the first microcracks 31 may be formed in the second metal layer 40 along with the second microcracks 41 that communicate with the first microcracks 31. However, since the third microcracks 42 do not form the paths along which the electromagnetic waves transmitted and received by the LF antenna 4a and the RF antenna 4b and the electric field generated from the capacitance touch sensor 6 are transmitted, formation and number thereof may be suitably minimized.

The protective layer 50 may be formed of a resin on a surface of the second metal layer 40 to protect the first metal layer 30 and the second metal layer 40, and may suitably include, or be formed as a UV hard coating layer.

As the protective layer 50 is formed as the UV hard coating layer, cracks may be generated due to a difference in shear stress among the first metal layer 30, the second metal layer 40, and the protective layer 50 when the protective layer 50 is formed, and thus an effect of increasing the number of first microcracks 31 and the number of second microcracks 41 may be expected.

A variation ΔE of the electric field in the cover 3 formed as described above is preferably equal to or greater than about 30 such that the performance of the LF antenna 4a and the RF antenna 4b, and the performance of the capacitance touch sensor 6 can be ensured at a desired level.

Further, to realize the metallic texture, a gloss of the cover 3 may be equal to or greater than about 450 GU, and a color difference (L*) of the cover 3 may be equal to or greater than about 85.

EXAMPLE

Hereinafter, the present invention will be described using examples and comparative examples.

To ensure the performance of the LF antenna and the RF antenna, and the performance of the capacitance touch sensor in the door outer handle at a desired level, it can be inferred that the more the first microcracks formed in the first metal layer, the better. Meanwhile, the higher the tensile stress formed inside the first metal layer when the first metal layer is deposited, the more the first microcracks formed in the first metal layer are formed. To this end, kinds and contents of components of the primer layer on which the first metal layer is deposited are important.

First, a test for examining an exterior and various characteristics of the cover depending on kinds and contents of the components of which the primer layer was formed was performed.

The primer layer was formed while changing the kinds and contents of the components of which the primer layer was formed as in FIG. 4A, and results of the test were shown in FIG. 4B. In FIG. 4A, the unit of the content of each component was wt %.

Further, photographs of evaluation of contact angles of Example 1, Comparative Example 11, and Comparative Example 18 were shown in FIG. 6.

Figure 5A:
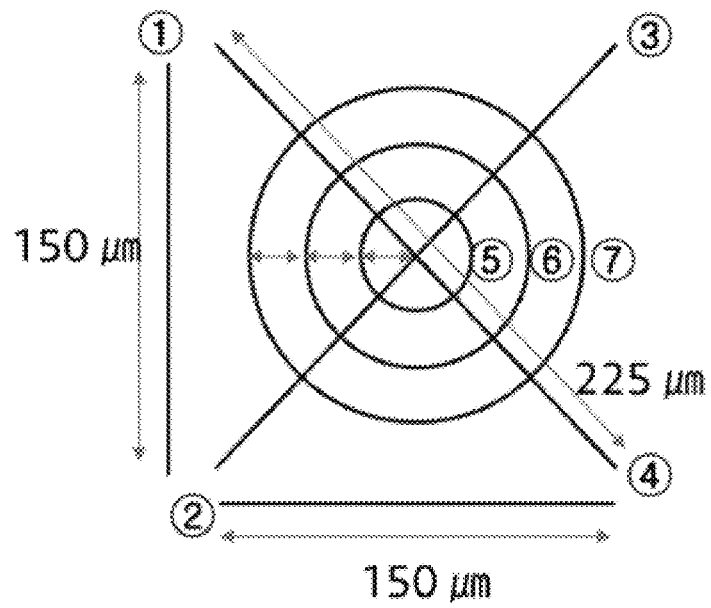
FIGS. 5A and 5B show an exemplary method of measuring the number of microcracks.
Figure 5B:
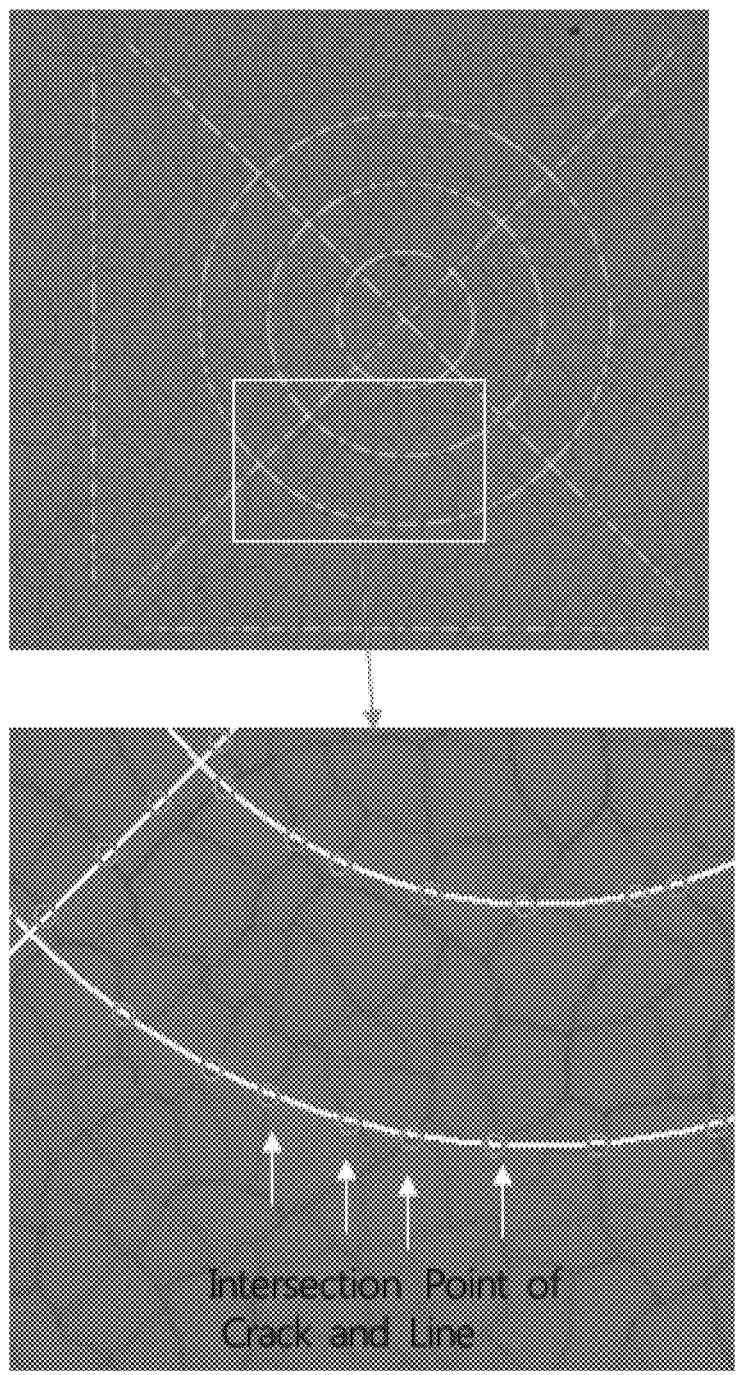

Meanwhile, FIGS. 5A and 5B are views illustrating a method of determining the number of microcracks. ISO 643 (Steel-Micrographic determination of the ferritic or austenitic grain size) was utilized to determine and quantify the number of microcracks formed in the first metal layer. For example, the number of first microcracks was fixed by setting numerous lines in a unit area of 150×150 that is, a total of seven lines including a vertical line, a horizontal line, a diagonal, and a circle as illustrated in FIG. 5A, and detecting the number of points that intersect the numerous lines as illustrated in FIG. 5B. According to this method, the number of first microcracks having irregular shapes and lengths could be quantified.

According to the results of FIG. 4B and from the results in Comparative Examples 16 and 17, when a type of the oligomer of the primer layer was used as polyester acrylate or epoxy acrylate, a larger water contact angle was formed when a contact angle was measured by dropping a water drop such that a surface energy of the primer layer was low. The primer layer having a low surface energy did not impart high tensile stress to the adjoining first metal layer, and thus the number of first microcracks formed in the first metal layer was not easily increased. In this way, when the first microcracks were not sufficiently formed in the first metal layer, the result that receiving distances of the LF antenna and the RF antenna were reduced and the detection performance of the capacitance touch sensor was not satisfied could be confirmed.

In contrast, as shown from the results in Examples 1 and 2, when a type of the oligomer of the primer layer was used as urethane acrylate, the contact angle was small, the tensile stress inside the first metal layer was increased due to the resultant high surface energy, and the number of first microcracks was increased. Thus, the result that the receiving distances of the LF antenna and the RF antenna were lengthened to be 50 m or greater and the performance of the capacitance touch sensor was not satisfied could be confirmed.

Meanwhile, characteristics of the primer layer were changed depending on a functional group inside urethane acrylate. As shown from the results of Comparative Examples 1 and 2, when urethane acrylate having two functional groups was 0 or 5 wt %, urethane acrylate was not attached to the first metal layer. As shown from the result in Comparative Example 3, in a case where urethane acrylate having two functional groups was 25 wt %, a pin hole phenomenon occurred externally where urethane acrylate and urethane acrylate satisfied chemical resistance.

Further, as shown from the results in Comparative Examples 4 and 5, when urethane acrylate having six functional groups was 0 or 5 wt %, the components of which the primer layer was formed were not mixed. As shown from the result in Comparative Example 6, in a case where urethane acrylate having six functional groups was 25 wt %, a pin hole phenomenon occurred to incur a bad external state.

As shown from the results in Comparative Examples 7 and 8, when urethane acrylate having four or nine functional groups was used, orange peel occurred externally, and urethane acrylate was unfit for use as a paint for a vehicle.

Meanwhile, as shown from the results in Comparative Examples 9 and 10, when PETA or DPHA was added as a monomer, a pin hole phenomenon occurred to incur a bad external state.

As shown from the result in Comparative Example 11, when urethane acrylate having two functional groups, urethane acrylate having six functional groups, and urethane acrylate having nine functional groups were mixed and DPHA was used and mixed as a monomer, various durability properties (humidity resistance/chemical resistance/water resistance) were satisfied, but tensile stress was not sufficiently imparted to the first metal layer, so that the number of first microcracks was small, and thus the result that the receiving distances of the LF antenna and the RF antenna was reduced, and the performance of the capacitance touch sensor was not satisfied could be confirmed.

Further, in comparison with Comparative Example 11, in a case of Comparative Examples 12 to 15 in which urethane acrylate having six functional groups and urethane acrylate having nine functional groups were adjusted and a content of DPHA as a monomer was changed, durability properties such as humidity resistance/chemical resistance/water resistance were satisfied, or the external state was poor.

Meanwhile, as shown from the result in Comparative Example 18, in a case of the primer layer used as vehicle exterior materials such as a radar cover in the past, a water contact angle was large. Thus, the result that, due to low surface energy, the first microcracks were not sufficiently formed, the receiving distances of the LF antenna and the RF antenna was reduced, and the performance of the capacitance touch sensor was not satisfied could be confirmed.

Therefore, the primer layer was suitably include 7.5 to 20 wt % urethane acrylate having two functional groups, 10 to 20 wt % urethane acrylate having six functional groups, 10 to 20 wt % hexanediol diacrylate (HDDA), 10 to 20 wt % trimethylolpropane triacrylate (TMPTA), and a balance of a solvent.

A variation ($\Delta E$) in electric field, a gloss, and a color difference according to the thickness of the second metal layer deposited on the surface of the first metal layer were measured, and a variation of the thickness and results thereof are shown in FIG. 7. The thickness of the first metal layer was fixed to 50 nm, and the second metal layer was deposited and formed on the surface thereof.

As shown in FIG. 7, in a case of Comparative Example 19 in which the second metal layer was not formed and in a case of Comparative Example 20 in which the thickness of the second metal layer was thinner than the suggested range, the variation ($\Delta E$) in electric field was 30 or greater, and thus the performance was satisfied, and the gloss and the color difference were not satisfied at a desired level. As a result, the receiving distances of the LF antenna and the RF antenna and the performance of the capacitance touch sensor were satisfied, but the metallic texture was not realized.

Further, in a case of Comparative Example 21 in which the thickness of the second metal layer was thicker than the suggested range, the gloss and the color difference were satisfied at a desired level because the gloss was 570 GU and the color difference was 91.5, and the variation ($\Delta E$) in electric field was not satisfied because the variation ($\Delta E$) in electric field was 15. As a result, a phenomenon that the second metal layer blocked the first microcracks formed in the first metal layer when the second metal layer was deposited occurred, and thus the metallic texture was realized. However, the result that the receiving distances of the LF antenna and the RF antenna were shortened and the performance of the capacitance touch sensor was not satisfied could be confirmed. Further, in the case of Comparative Example 21, the second metal layer blocked the first microcracks of the first metal layer, and the second microcracks were not formed in the second metal layer. As a result, a phenomenon that cross-linking was not sufficiently performed between primer layer and the protective layer with the first and second metal layers intervened therebetween and interlayer adhesion was deteriorated occurred.

In contrast, in a case of Examples 3 to 5 in which the thickness of the second metal layer satisfied 10 to 90 nm that was the suggested range, the variation ($\Delta E$) in electric field was 30 or greater, and thus the performance was satisfied, the gloss satisfied 450 GU, and the color difference ($L^*$) satisfied 85 or greater. As a result, the metallic texture was realized and the receiving distance of the LF antenna and the RF antenna and the performance of the capacitance touch sensor were satisfied.

The performance of the capacitance touch sensor was evaluated with respect to Comparative Example 16 and Example 1, and results thereof are shown in FIG. 8.

In the capacitance touch sensor, in a case where the electric field was radiated in air at all times and a hand of a driver was detected around the capacitance touch sensor, a change in electric field occurred. A vehicle door was opened/closed through the variation ($\Delta E$) in electric field. Meanwhile, the variation ($\Delta E$) in electric field should be 30 or greater, and reliable opening/closing performance of the vehicle door could be realized regardless of noise. As shown in FIG. 8, it could be confirmed that the variation (ΔE) in electric field was 15 in the case of Comparative Example 16, and that the variation (ΔE) in electric field was 60 in the case of Example 1.

Figure 9:
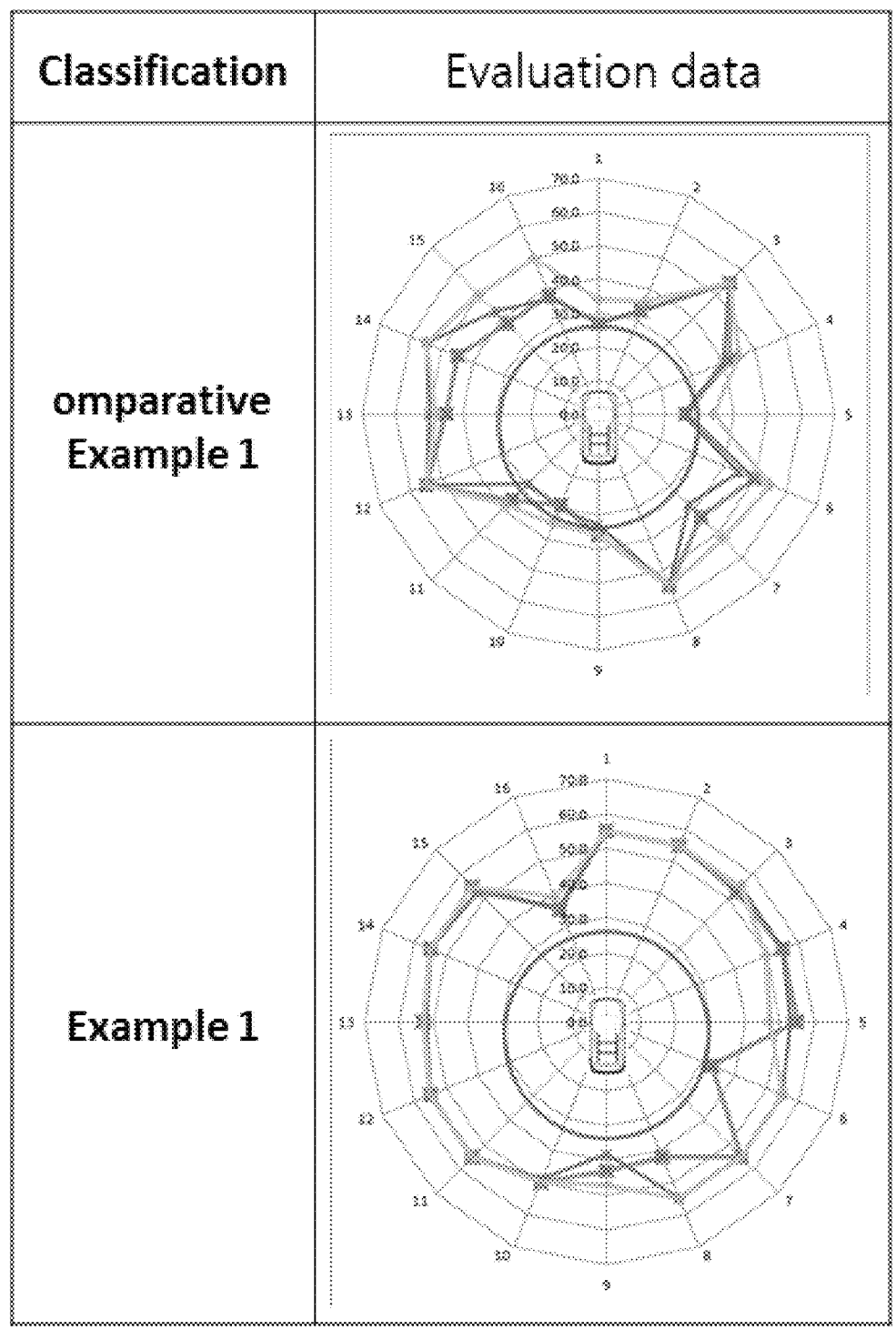
FIG. 9 shows receiving distances of the LF antenna and the RF antenna with respect to Comparative Example 1 and Example 1.

The receiving distances of the LF antenna and the RF antenna were evaluated with respect to Comparative Example 1 and Example 1, and results thereof are shown in FIG. 9. In this case, the receiving distances of the LF antenna and the RF antenna were measured with respect to three samples made according to Comparative Example 1 and Example 1. To be specific, a smart key for omnidirectional angles (0 to 360°) in a real vehicle and a recognizable detection distance between vehicles were measured. In this case, when the detection distance more than a reference detection distance (a red circle) illustrated in FIG. 9 was secured, the receiving distances of the LF antenna and the RF antenna had reliability.

As shown in FIG. 9, in the case of Comparative Example 1, the detection distance was less than the reference detection distance at directional angles of 0, 90, and 180. In contrast, in the case of Example 1, the detection distance was greater than the reference detection distance at the omnidirectional angles.

While the present invention has been described with reference to the attached drawings and exemplary embodiments, the present invention is not limited thereto, and is only limited by the claims to be described below. Thus, it is apparent to those skilled in the art that the present invention can be modified and changed in various ways without departing from the technical idea of the claims to be described below.

What is claimed is:

1. An electromagnetic-wave transmitting cover comprising:
    a substrate;
    a primer layer formed on a surface of the substrate wherein the primer layer comprises: an amount of about 7.5 to 20 wt % urethane acrylate having two functional groups, an amount of about 10 to 20 wt % urethane acrylate having six functional groups, amount of about 20 to 40 wt % of one or more monomers selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent, all the wt % based on the total weight of the primer layer; and
    a first metal layer formed on a surface of the primer layer and having a plurality of first microcracks penetrating in a thickness direction, wherein the first metal layer comprises one or more selected from the group consisting of chromium (Cr), a Cr alloy, titanium (Ti), and a Ti alloy.

2. The electromagnetic-wave transmitting cover according to claim 1, wherein the one or more monomers comprise an amount of about 10 to 20 wt % hexanediol diacrylate (HDDA) and an amount of about 10 to 20 wt % trimethylolpropane triacrylate (TMPTA).

3. The electromagnetic-wave transmitting cover according to claim 1, wherein a contact angle of the primer layer is equal to or less than about 70°.

4. The electromagnetic-wave transmitting cover according to claim 1, wherein the number of first microcracks determined according to a determination based on ISO 643 is equal to or greater than 200 in the first metal layer.

5. The electromagnetic-wave transmitting cover according to claim 1, further comprising a second metal layer formed on a surface of the first metal layer and having a plurality of second microcracks penetrating in a thickness direction and communicating with the first microcracks, wherein the second metal layer comprises aluminum (Al).

6. The electromagnetic-wave transmitting cover according to claim 5, further comprising a protective layer formed on a surface of the second metal layer, wherein the protective layer comprises a resin.

7. The electromagnetic-wave transmitting cover according to claim 6, wherein the protective layer comprises a UV hard coating layer.

8. A door outer handle used for a door of a vehicle comprising:
    a door body;
    a sensing body which is disposed on a surface of the door body and on which an LF antenna, an RF antenna, and a capacitance touch sensor are mounted; and
    a cover that is disposed to cover the sensing body and is provided such that electromagnetic waves transmitted and received by the LF and RF antennas mounted on the sensing body and an electric field generated from the capacitance touch sensor are transmitted,
    wherein the cover comprises:
    a substrate formed of plastic;
    a primer layer formed on a surface of the substrate; and
    a first metal layer formed on a surface of the primer layer and having a plurality of first microcracks penetrating in a thickness direction wherein the first metal layer comprises one or more selected from the group consisting of chromium (Cr), a Cr alloy, titanium (Ti), and a Ti alloy.

9. The door outer handle according to claim 8, wherein the primer layer comprises: an amount of about 7.5 to 20 wt % urethane acrylate having two functional groups, an amount of about 10 to 20 wt % urethane acrylate having six functional groups, an amount of about 20 to 40 wt % one or more monomers selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent, all the wt % based on the total weight of the primer layer.

10. The door outer handle according to claim 8, wherein the cover further comprises:
    a second metal layer formed on a surface of the first metal layer and having a plurality of second microcracks penetrating in a thickness direction and communicating with the first microcracks, wherein the second metal layer comprises aluminum (Al).

11. The door outer handle according to claim 10, wherein the cover further comprises:
    a protective layer formed on a surface of the second metal layer and comprising a resin.

12. The door outer handle according to claim 10, wherein:
    the first metal layer has a thickness of about 10 to 150 nm; and the second metal layer has a thickness of about 10 to 90 nm.

13. The door outer handle according to claim 8, wherein the number of first microcracks determined according to a determination based on ISO 643 is equal to or greater than about 200 in the first metal layer.

14. The door outer handle according to claim 11, wherein a variation (ΔE) in the electric field of the cover is equal to or greater than about 30.

15. The door outer handle according to claim 11, wherein a gloss of the cover is equal to or greater than about 450 GU.

16. The door outer handle according to claim 11, wherein a color difference (L*) of the cover is equal to or greater than about 85.

17. A vehicle comprising a door outer handle according to claim 8.

18. A method of producing an electromagnetic-wave transmitting cover, comprising:
providing a substrate;
forming a primer layer on the substrate by coating a composition, wherein the coating composition comprises: an amount of about 7.5 to 20 wt % urethane acrylate having two functional groups, an amount of about 10 to 20 wt % urethane acrylate having six functional groups, amount of about 20 to 40 wt % of one or more monomers selected from the group consisting of hexanediol diacrylate (HDDA), trimethylolpropane triacrylate (TMPTA), 2-hydroxyethyl acrylate (2-HEA), 2-hydroxyethyl methacrylate (2-HEMA), 2-hydroxypropyl acrylate (2-HPA), 2-hydroxypropyl methacrylate (2-HPMA), butanediol diacrylate (BUDA), tripropylene glycol diacrylate (TPGDA), triethylene glycol diacrylate (TEGDA), and neopentyl glycol diacrylate (NPGDA), and a balance of a solvent, all the wt % based on the total weight of the primer layer; and
forming a first metal layer formed on a surface of the primer layer by depositing one or more selected from the group consisting of chromium (Cr), a Cr alloy, titanium (Ti), and a Ti alloy.

19. The method according to claim 18, further comprising forming a second metal layer on a surface of the first metal layer by depositing aluminum (Al).

20. The method according to claim 19, further comprising forming a protective layer formed on a surface of the second metal layer wherein the protective layer comprises a resin.

* * * * *